US010655457B2

(12) United States Patent
Yang et al.

(10) Patent No.: US 10,655,457 B2
(45) Date of Patent: May 19, 2020

(54) APPARATUS AND METHOD OF PROPAGATION AND SPATIAL LOCATION ANALYSIS BY ACOUSTIC ARRAY FOR DOWN-HOLE APPLICATIONS

(71) Applicant: GOWell International, LLC, Houston, TX (US)

(72) Inventors: Qinshan Yang, Katy, TX (US); Jinsong Zhao, Houston, TX (US)

(73) Assignee: GOWell International, LLC, Houston, TX (US)

( * ) Notice: Subject to any disclaimer, the term of this patent is extended or adjusted under 35 U.S.C. 154(b) by 684 days.

(21) Appl. No.: 15/334,518

(22) Filed: Oct. 26, 2016

(65) Prior Publication Data

US 2018/0112523 A1     Apr. 26, 2018

(51) Int. Cl.
*E21B 47/10*     (2012.01)
*G01V 1/48*     (2006.01)
*G01V 1/50*     (2006.01)

(52) U.S. Cl.
CPC .............. *E21B 47/101* (2013.01); *G01V 1/48* (2013.01); *G01V 1/50* (2013.01)

(58) Field of Classification Search
CPC .......... G01V 1/50; G01V 1/48; E21B 47/101
See application file for complete search history.

(56) References Cited

U.S. PATENT DOCUMENTS

| 6,026,913 A * | 2/2000 | Mandal ............ E21B 47/02208 175/45 |
| 2009/0067286 A1 | 3/2009 | Bose et al. |
| 2012/0201096 A1 | 8/2012 | Valero et al. |

OTHER PUBLICATIONS

"Applications of sonics and ultrasonics in geophysical prospecting," by Sinha et al. Dated 1999 in Ultrasonics Symposium.
"Real-time completion monitoring with acoustic waves," by Bakulin et al. Dated Jan. 1, 2008 in Geophysics, vol. 73 No. 1.
European Search Report for Application No. 17198718.3 dated Feb. 28, 2018.

* cited by examiner

*Primary Examiner* — John E Breene
*Assistant Examiner* — L. Anderson
(74) *Attorney, Agent, or Firm* — Tumey L.L.P.

(57) ABSTRACT

Methods for locating an acoustic source. A method may comprise measuring noise from the acoustic source from a downhole environment, which produces a measurement for processing, performing a dispersion analysis on the measurement, performing a space entropy equalization and normalization process on the measurement, performing a weighted integration on the measurement, performing a pattern recognition on the measurement, performing a weighted enhancement on the measurement, and producing a recognition factor from the measurement. A method may comprise measuring noise from the acoustic source from a downhole environment, which produces a measurement for processing, performing a dispersion analysis on the measurement, performing a time difference scan on the measurement, performing a propagation distance scan on the measurement, performing a weighted enhancement on the measurement, and producing a recognition factor from the measurement.

20 Claims, 9 Drawing Sheets

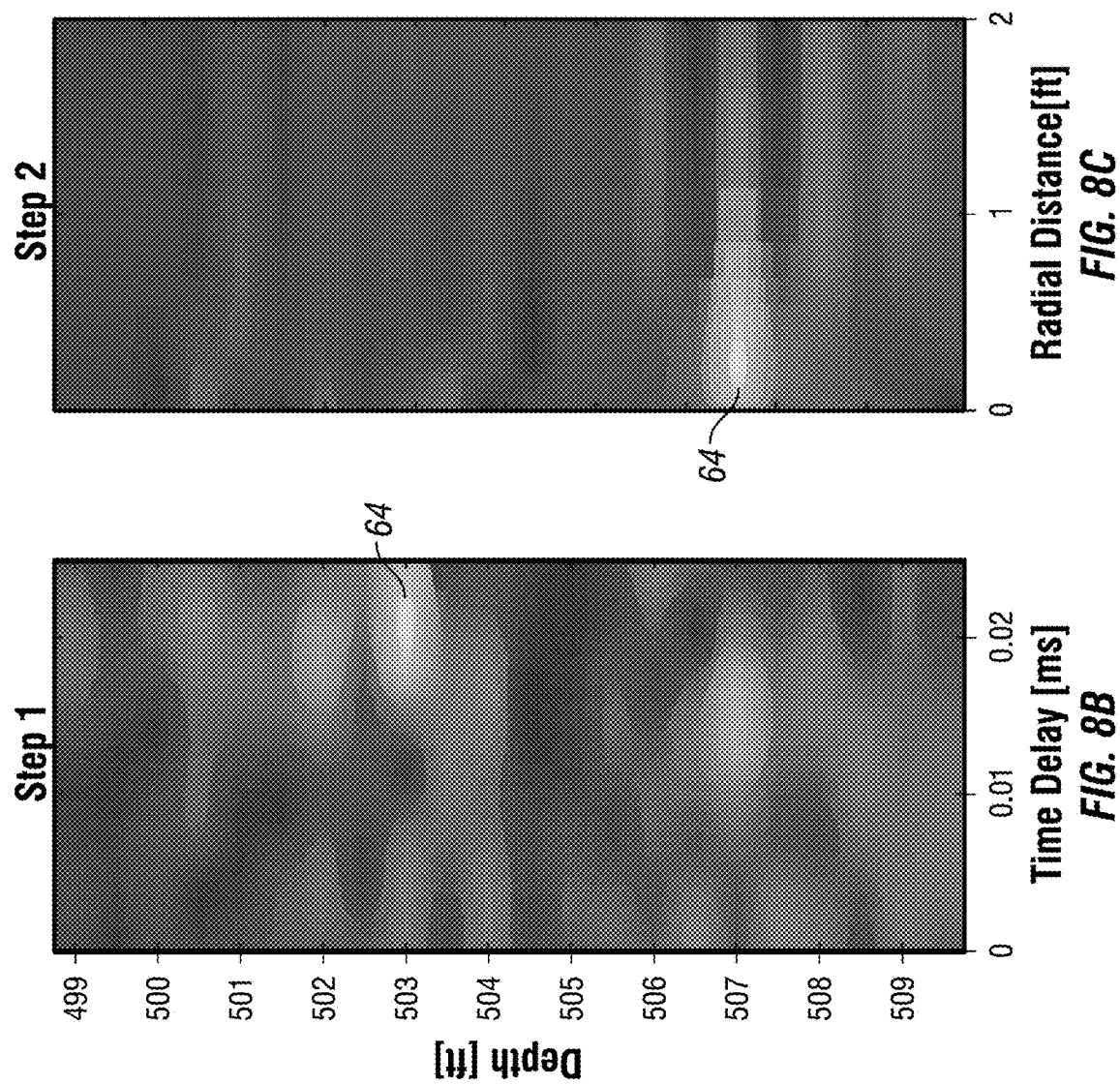
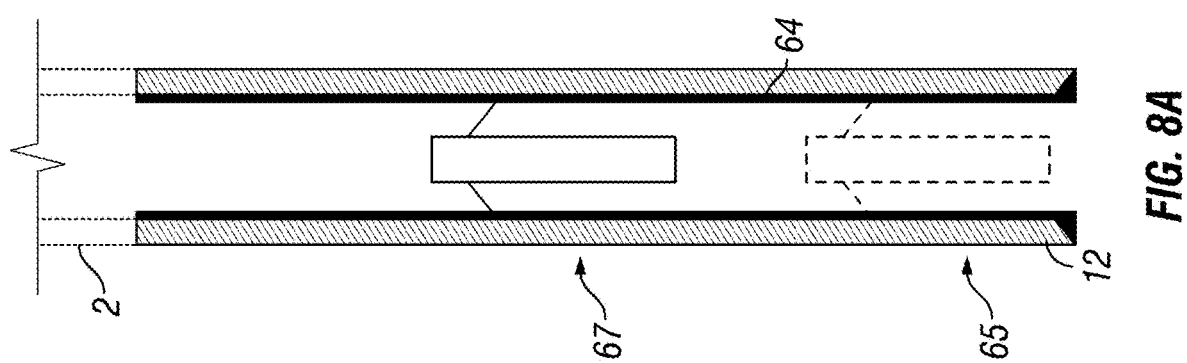

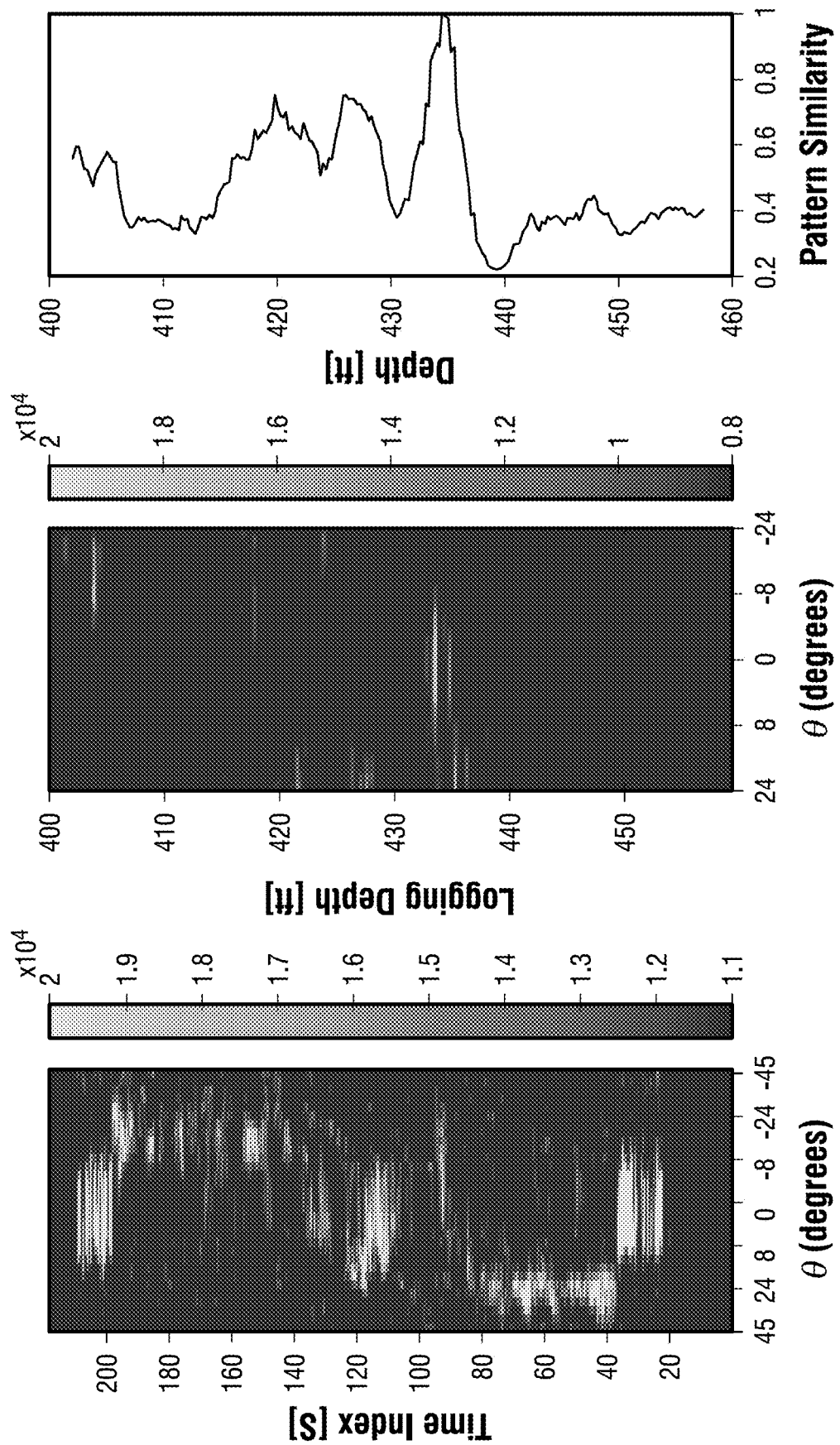

APPARATUS AND METHOD OF PROPAGATION AND SPATIAL LOCATION ANALYSIS BY ACOUSTIC ARRAY FOR DOWN-HOLE APPLICATIONS

BACKGROUND OF THE INVENTION

Field of the Disclosure

This disclosure relates to a field for a downhole tool that may be capable of detecting acoustic sources within tubing and/or casing. By processing recorded signals from a sensor array in a propagation analysis and/or a spatial localization analysis, an acoustic source may be identified within tubing and/or a casing.

Background of the Disclosure

Tubing may be used in many different applications and may transport many types of fluids. Tubes may be conventionally placed underground and/or positioned in an inaccessible area, making inspection of changes within tubing difficult. Previous methods for inspecting tubes have come in the form of non-destructive inspection tools such as electromagnetic devices that may measure magnetic flux-leakage within tubing, which may not be able to detect changes in multi-pipe situations. Additionally, previous methods may not be able to perform multi-pipe azimuthal imaging. Without limitation, different types of inspection may use multiple types of downhole tools. A single electromagnetic device may be well suited for multiple types of tube inspection because it may operate and may be insensitive to any fluid within the tube and may use a single tool for a plurality of measurements.

Previous devices and methods may only measure flux-leakage and may only be useful for the detection of localized damage in ferromagnetic pipes. The measurement of flux-leakage may be hindered by the type of tube, thinning of tubing, requirements of a strong magnetic field, strong flux coupling, and a need for the device to be in close proximity to the tube walls. Transient electromagnetic methods using pulsed electromagnetic waves may be limited to increasing the signals from a second tube wall to additional tube walls, have problems optimizing a receiver coil, and may suffer Signal-to-Noise Ratio problems.

Consequently, there is a need for an inspection device and methods that may be able to detect and record multiple types of information and/or properties of tubing to determine the location of an acoustic source. In downhole applications, an inspection device with multi-tubing wall variation imaging detection that may be capable of determining properties of tubing and may be accurate and efficient may be in high demand.

BRIEF SUMMARY OF SOME OF THE PREFERRED EMBODIMENTS

These and other needs in the art may be addressed in embodiments by a method for processing measurements recorded by an inspection device.

Methods for locating an acoustic source. A method may comprise measuring noise from the acoustic source from a downhole environment, which produces a measurement for processing, performing a dispersion analysis on the measurement, performing a space entropy equalization and normalization process on the measurement, performing a weighted integration on the measurement, performing a pattern recognition on the measurement, performing a weighted enhancement on the measurement, and producing a recognition factor from the measurement.

A method may comprise measuring noise from the acoustic source from a downhole environment, which produces a measurement for processing, performing a dispersion analysis on the measurement, performing a time difference scan on the measurement, performing a propagation distance scan on the measurement, performing a weighted enhancement on the measurement, and producing a recognition factor from the measurement.

A method for locating an acoustic source may comprise measuring noise from the acoustic source from a down hole environment, which may produce a measurement for processing, performing a dispersion analysis on the measurement, performing a space entropy equalization and normalization process on the measurement, performing a weighted integration on the measurement, performing a pattern recognition on the measurement, performing a time difference scan on the measurement, performing a propagation distance scan on the measurement, performing a weighted enhancement on the measurement, and producing a recognition factor from the measurement.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which:

FIG. 8a illustrates an acoustic source downhole;

FIG. 8b illustrates an acoustic source in a time delayed graph;

FIG. 8c illustrates an acoustic source in a depth to radial distance graph;

FIG. 9a illustrates a time vs degree graph of an acoustic source;

FIG. 9b illustrates a processed information in depth vs degree graph;

FIG. 9c illustrates a graph of the acoustic source moving from a position below to a position above the inspection device;

DETAILED DESCRIPTION OF THE PREFERRED EMBODIMENTS

The present disclosure relates to embodiments of a device and method for inspecting and detecting characteristics of tubing and devices attached to tubing. More particularly, embodiments of a device and method are disclosed for inspecting a number of tube walls surrounding an innermost tube wall.

Figure 1:
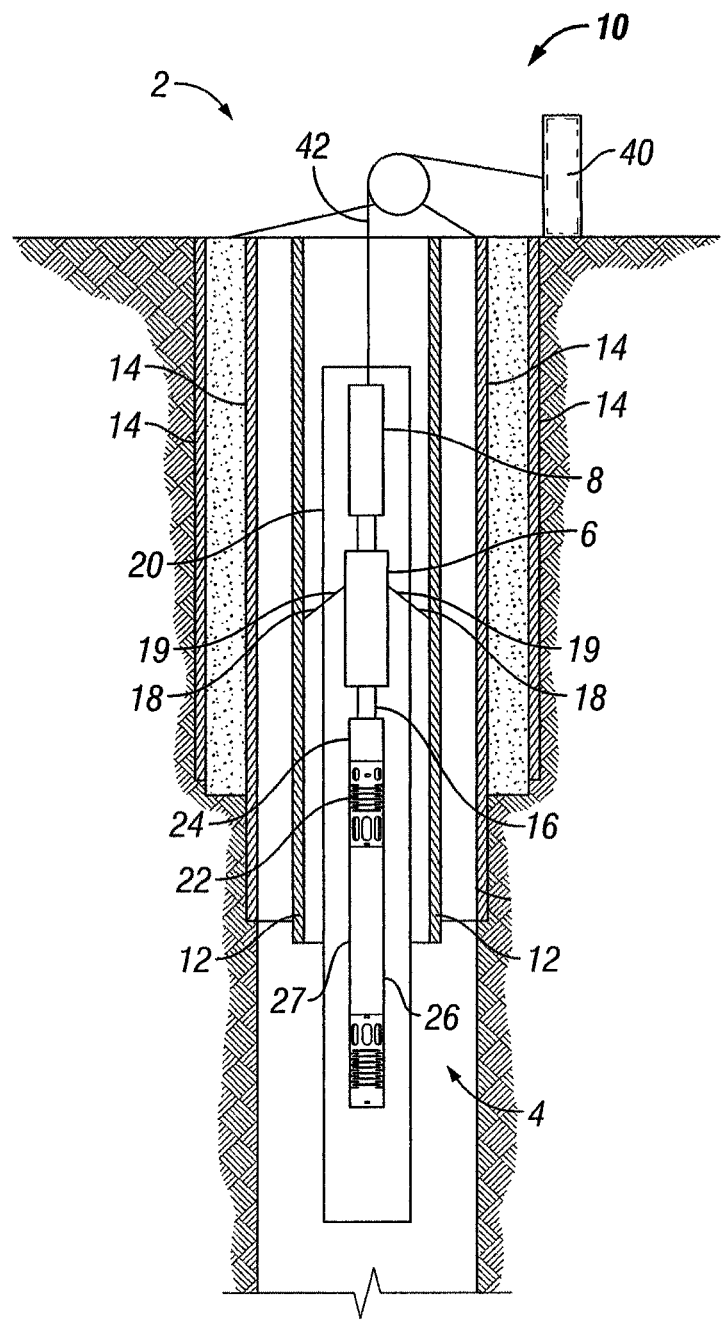
FIG. 1 illustrates an embodiment of an inspection system disposed downhole.

FIG. 1 illustrates an inspection system 2 comprising an inspection device 4, a centralizing module 6, a telemetry module 8, and a service device 10. In embodiments, inspection device 4 may be inserted into tubing 12, wherein tubing 12 may be contained within casing 14. In further embodiments, there may be a plurality of casing 14, wherein tubing 12 may be contained by several additional casings 14. In embodiments, as shown, inspection device 4 may be disposed below centralizing module 6 and telemetry module 8. In other embodiments, not illustrated, inspection device 4 may be disposed above and/or between centralizing module 6 and telemetry module 8. In embodiments, inspection device 4, centralizing module 6, and telemetry module 8 may be connected to tether 16. Tether 16 may be any suitable cable that may support inspection device 4, centralizing module 6, and telemetry module 8. A suitable cable may be steel wire, steel chain, braided wire, metal conduit, plastic conduit, ceramic conduit, and/or the like. A communication line, not illustrated, may be disposed within tether 16 and connect inspection device 4, centralizing module 6, and telemetry module 8 with service device 10. Without limitation, inspection system 2 may allow operators on the surface to review recorded data in real time from inspection device 4, centralizing module 6, and telemetry module 8.

As illustrated in FIG. 1, service device 10 may comprise a mobile platform (i.e. a truck) or stationary platform (i.e. a rig), which may be used to lower and raise inspection system 2. In embodiments, service device 10 may be attached to inspection system 2 by tether 16. Service device 10 may comprise any suitable equipment which may lower and/or raise inspection system 2 at a set or variable speed, which may be chosen by an operator. The movement of inspection system 2 may be monitored and recorded by telemetry module 8.

Telemetry module 8, as illustrated in FIG. 1, may comprise any devices and processes for making, collecting, and/or transmitting measurements. For instance, telemetry module 8 may comprise an accelerator, gyro, and the like. In embodiments, telemetry module 8 may operate to indicate where inspection system 2 may be disposed within tubing 12 and the orientation of sensor array 26, discussed below. Telemetry module 8 may be disposed at any location above, below, and/or between centralizing module 6 and inspection device 4. In embodiments, telemetry module 8 may send information through the communication line in tether 16 to a remote location such as a receiver or an operator in real time, which may allow an operator to know where inspection system 2 may be located within tubing 12. In embodiments, telemetry module 8 may be centered about laterally in tubing 12.

As illustrated in FIG. 1, centralizing module 6 may be used to position inspection device 4 and/or telemetry module 8 inside tubing 12. In embodiments, centralizing module 6 laterally positions inspection device 4 and/or telemetry module 8 at about a center of tubing 12. Centralizing module 6 may be disposed at any location above and/or below telemetry module 8 and/or inspection device 4. In embodiments, centralizing module 6 may be disposed above inspection device 4 and below telemetry module 8. Centralizing module 6 may comprise arms 18. In embodiments, there may be a plurality of arms 18 that may be disposed at any location along the exterior of centralizing module 6. Specifically, arms 18 may be disposed on the exterior of centralizing module 6. In an embodiment, as shown, at least one arm 18 may be disposed on opposing lateral sides of centralizing module 6. Additionally, there may be at least three arms 18 disposed on the outside of centralizing module 6. Arms 18 may be moveable at about the connection with centralizing module 6, which may allow the body of arm 18 to be moved closer and/or farther away from centralizing module 6. Arms 18 may comprise any suitable material. Suitable material may be but is not limited to, stainless steel, titanium, metal, plastic, rubber, neoprene, and/or any combination thereof. In embodiments, centralizing module 6 may further comprise springs 19. Springs 19 may assist arms 18 in moving centralizing module 6 away from tubing 12, and thus inspection device 4 and telemetry module 8, to about the lateral center of tubing 12. Without limitation, centering inspection device 4 may produce more reliable and accurate voltage readings of tubing 12.

Inspection device 4, as illustrated in FIG. 1, may be located below centralizing module 6 and/or telemetry module 8. Inspection device 4 may be able to detect defects, measure resistivity of tubing 12 and/or casing 14, detect free pipe, and/or the like. In embodiments, inspection device 4 may be able to detect, and/or locate transverse and longitudinal defects (both internal and external). Tubing 12 may be made of any suitable material for use in a wellbore. Suitable material may be, but is not limited to, metal, plastic, and/or any combination thereof. Additionally, any type of fluid may be contained within tubing 12 such as, without limitation, water, hydrocarbons, and the like. In embodiments, there may be additional tubing which may encompass tubing 12. Inspection device 4 may comprise a housing 20, a memory module 22, a receiver controller 24, and a sensory array 26. Housing 20 may be any suitable length in which to protect and house the components of inspection device 4. In embodiments, housing 20 may be made of any suitable material to resist corrosion and/or deterioration from a fluid. Suitable material may be, but is not limited to, titanium, stainless steel, plastic, and/or any combination thereof. Housing 20 may be any suitable length in which to properly house the components of inspection device 4. A suitable length may be about one foot to about ten feet, about four feet to about eight feet, about five feet to about eight feet, or about three feet to about six feet. Additionally, housing 20 may have any suitable width. The width may include a diameter from about one foot to about three feet, about one inch to about three inches, about three inches to about six inches, about four inches to about eight inches, about six inches to about one foot, or about six inches to about two feet. Housing 20 may protect memory module 22, a receiver controller 24, and sensory array 26 from the surrounding downhole environment within tubing 12.

As illustrated in FIG. 1, memory module 22 may be disposed within inspection device 4. In embodiments, memory module 22 may store all received, recorded and measured data and may transmit the data in real time through a communication line in tether 16 to a remote location such as an operator on the surface. Memory module 22 may comprise flash chips and/or ram chips, which may be used to store data and/or buffer data communication. Additionally, memory module 22 may further comprise processing unit and/or a microcontroller. In embodiments, memory module 22 may be removed from inspection device 4 for further processing. Memory module 22 may be disposed within any suitable location of housing 20 such as about the top, about the bottom, or about the center of housing 20. In embodiments, memory module 22 may be in communication with receiver controller 24 and sensor array 26 by any suitable means such as by a connection to receiver controller 24 and sensor array 26 by a communication line 27.

Receiver controller 24, as illustrated in FIG. 1, may control the amplitude and phase of an amplifier factor and signal acquiring period of sensor array 26. Receiver controller 24 may be pre-configured at the surface to take into account the downhole logging environment and specific logging cases, which may be defined as static configuration, discussed below. It may also be dynamically configured by what a receiver may record. Receiver controller 24 may be disposed at any suitable location within housing 20. In embodiments, such disposition may be about the top, about the bottom, or about the center of housing 20. Sensor array 26 may be disposed within a sensor array housing 29. In embodiments, sensor array 26 may be disposed in a fluid within sensor array housing 29. This may prevent sensor array 26 from moving during operations and further protect sensor array 26 from subsurface pressure. Sensor array 26 may be disposed at any suitable location within housing 20, referring to FIG. 1. Such disposition may be at about the top, about the bottom, or about the center of housing 20. Additionally, there may be a plurality of sensor arrays 26 disposed throughout housing 20.

Figure 2:
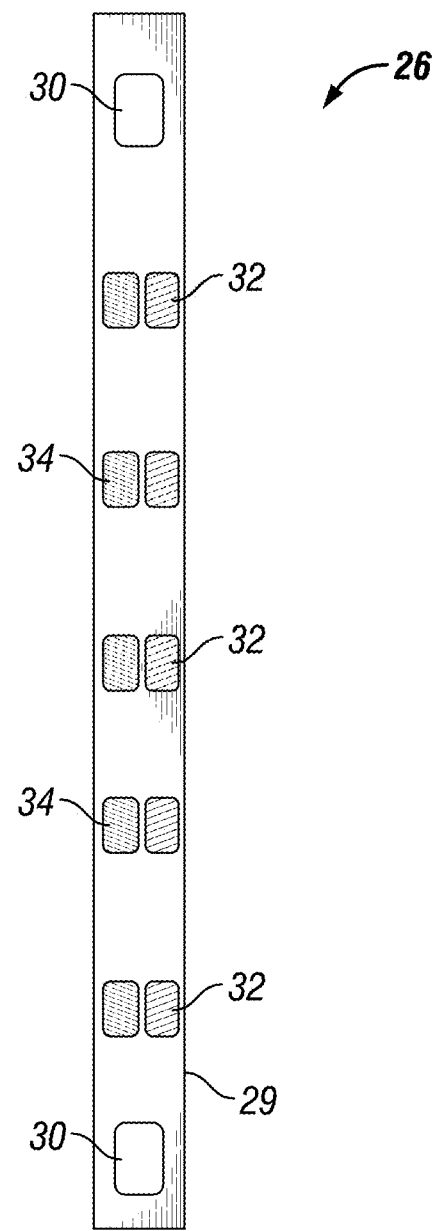
FIG. 2 illustrates an embodiment of a sensor array.

As illustrated in FIG. 2, sensory array 26 may comprise at least one type of sensor array 26, such as a monopole array 30, a differential array 32, and/or an azimuthal array 34. The difference in the voltages measured from tubing 12, referring to FIG. 1, by at least one sensor array 26 may be used to identify characteristics of tubing 12 and/or casing 14, referring to FIG. 1.

In embodiments as shown in FIG. 2, without limitation, sensor array 26 may comprise a monopole array 30, a differential array 32, and/or an azimuthal array 34. In embodiments, monopole array 30 may pick up road noise patterns and wave propagation detection of road noise. In embodiments, differential array 32 may pick up leak noise, may cancel common mode, may be used in wave propagation analysis and/or attenuation analysis, or nay combinations thereof. In embodiments, azimuthal array 34 may be used to accomplish monopole and differential array measurements and may be part of four segments for CBL. CBL refers to Cement Bond Log. It should be noted that monopole array 30, differential array 32, and/or azimuthal array 34 may be disposed within sensory array 26 in any desired order and may comprise more than one monopole array 30, more than one differential array 32, and/or more than one azimuthal array 34.

Additionally, memory module 22 may be used to record and transmit the recorded voltages within sensor array 26.

An electro-magnetic field may be produced and emitted from sensor array 26. In embodiments, the electro-magnetic field may be of sufficient strength and size to induce an eddy current in a second tube and/or a second casing (not illustrated). Without limitation, the electro-magnetic field may be able to induce an eddy current into a fifth casing and may be up to three feet into a formation. It should be noted that electro-magnetic field may induce an eddy current in additional outside tubing. In embodiments, transmitter coil 25 may be turned off and on at any given length of time. When turned on, transmitter coil 25 may produce an electro-magnetic field and may induce eddy current in tubing 12 and/or casing 14. Transmitter coil 25 may then be switched off, which may allow for sensor array 26 to sense and record the voltage produced by the induced eddy current. Turning transmitter coil 25 on and off may be repeated continuously as measurements of tube 12 and/or casing 14, any additional outer tubing 12 and/or casing 14, may be performed.

Measurements, inspections, and detections may take place as inspection device 4 moves through tube 12 in any direction. Travel time of inspection device 4 through a zone of interest within tube 12 may depend on the duration of pulses and amplitude used to produce and transmit an electro-magnetic field through inspection device 4. Duration of a pulse may be set so that the signal variation between the excitation time and the "infinite" excitation time may be less than the noise constantly detected at signal level. Duration may vary based on the "electromagnetic" wall thickness of the inspected tube 12. Electromagnetic wall thickness refers to the given conductivity and relative permeability with tube 12 thickness. The electro-magnetic field created by the pulse may be used to induce an eddy current in tube 12 and/or additional tubing. Additionally, transmitter coil 25 may allow for inspection device 4 to transmit an electro-magnetic field three hundred and sixty degrees, which may allow inspection device 4 to inspect the entirety of tube 12, surrounding tubes, and/or casing 14.

In embodiments, as shown in FIG. 1, signals recorded by sensor array 26 may be processed using information handling system 40. In an embodiment, information handling system 40 may be disposed within inspection device 4 at any location. Without limitation, information handling system 40 may also be disposed on the surface within service device 10. Processing may take place within information handling system 40, within inspection device 4, and/or on the surface in service device 10. Information handling system 40 within inspection device 4 may connect to service device 10 through waveguide 42, which may be disposed within tether 16. It is to be understood that waveguide 42, as shown disposed in FIG. 1 for illustration purposes only, may be disposed within tether 16. Information handling system 40 may act as a data acquisition system and possibly a data processing system that analyzes signals from the receiving array, for example, to derive one or more properties of tubing 12 and/or casing 14.

Without limitation in this disclosure, information handling system 40 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, information handling system 40 may be a personal computer, a network storage device, or any other suitable device and may vary in size, shape, performance, functionality, and price. Information handling system 40 may include random access memory (RAM), one or more processing resources such as a central processing unit (CPU) or hardware or software control logic, ROM, and/or other types of nonvolatile memory. Additional components of information handling system 40 may include one or more disk drives, one or more network ports for communication with external devices as well as various input and output (I/O) devices, such as a keyboard, a mouse, and a video display. Information handling system 40 may also include one or more buses operable to transmit communications between the various hardware components.

Certain examples of the present disclosure may be implemented at least in part with non-transitory computer-readable media. For the purposes of this disclosure, non-transitory computer-readable media may include any instrumentality or aggregation of instrumentalities that may retain data and/or instructions for a period of time. Non-transitory computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EE-PROM), and/or flash memory; as well as communications media such as wires, optical fibers, microwaves, radio waves, and other electromagnetic and/or optical carriers; and/or any combination of the foregoing.

Figure 3:
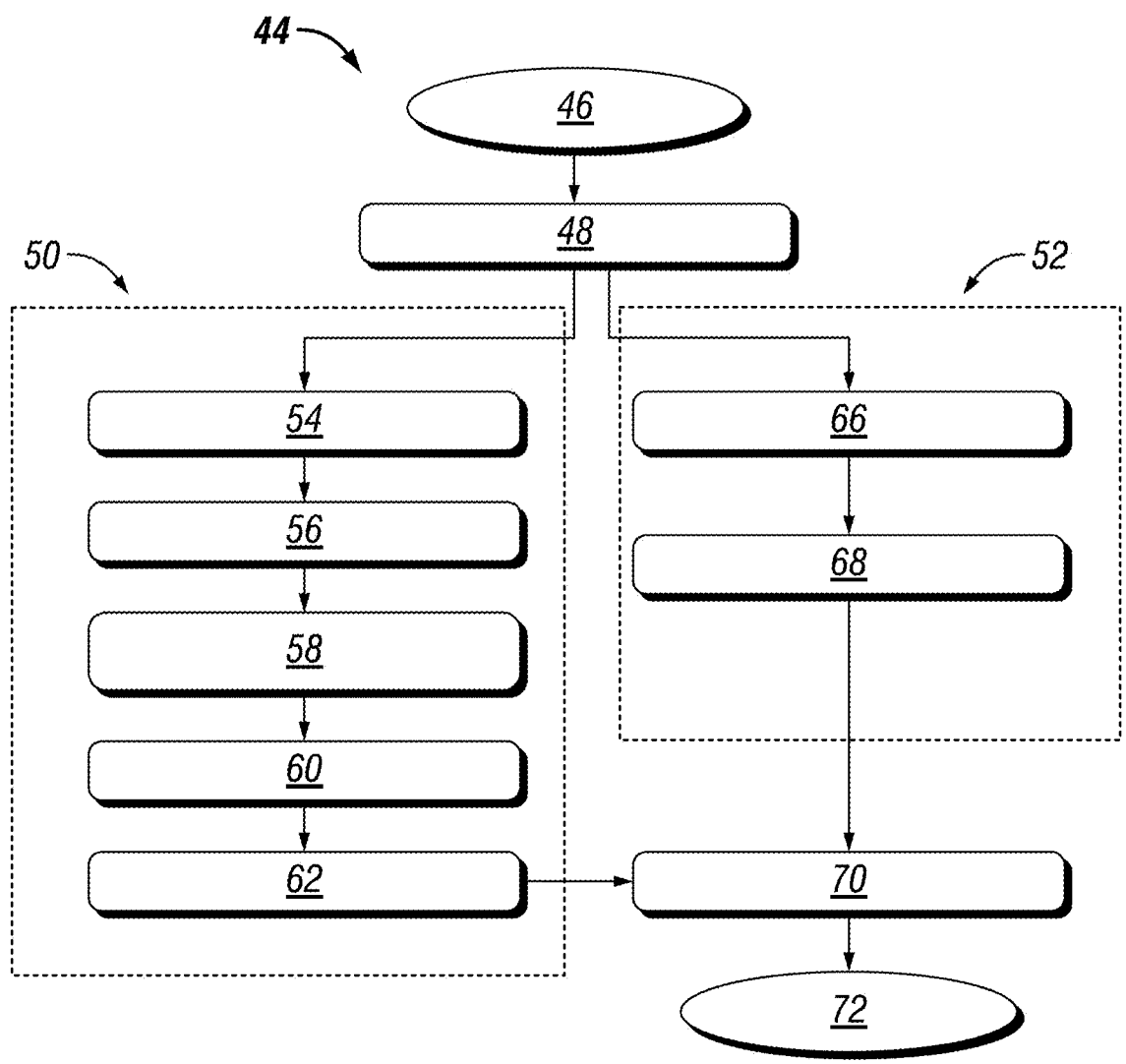
FIG. 3 illustrates a method for detecting an acoustic source.

Information handling system 40 may process information, in embodiments on the surface and/or downhole, to determine the location of a defect in tube 12 and/or casing 14. FIG. 3 illustrates a flowchart for a method 44 for determining the location of an acoustic source. Without limitation, method 44 may be implemented to recognize and localize any acoustic sources in a downhole setting. For example, acoustic sources may comprise a fluid leak, channeling, perforation inflow, sand entry, and/or reservoir flow. In block 46, an acoustic array measurement may be taken. Without limitation, measurements may be recorded by sensor array 26, discussed above. The receiving coil array of sensor array 26 may comprise a monopole array 30, a differential array 32, and/or an azimuthal array 34, as shown in FIG. 2. Recordings from monopole array 30, differential array 32, or azimuthal array 34 may be simultaneous. Each receiving array may record simultaneously during measurements. There may be one monopole array 30, differential array 32, or azimuthal array 34. Distances between each sensor may be about half a foot to about ten feet, about three feet to about six feet, about four feet to about eight feet, and/or about one foot to about five feet. Measurements recorded by monopole array 30, differential array 32, or azimuthal array 34 may be in the form of a time domain, frequency domain, and/or any data domain that is recorded with acoustic array sensors.

As shown in embodiments of FIG. 3, Measurements from block 46 may be transferred to block 48 for preprocessing. Without limitation, preprocessing may implement gain correction, tool compensation, environment correction, anti-aliasing filters, and the like. In embodiments, gain correction may seek to control signal amplitude at an output. Gain correction may be defined as, removing any artificial gain that may be implemented on the output, which may isolate the signal amplitude as the only measured response preventing measurements from inspection device 4. In embodiments, tool compensation may correct for variables that the tool may naturally produce. In some embodiments, environment correction may adjust for the naturally occurring signals and/or signals produced from the natural objects. For example, different borehole size may impact the measurements, and/or the borehole impact may be removed in the environment correction step. In embodiments, an anti-aliasing filter may smooth jagged edges on curved lines and diagonals from an emitted signal. An anti-aliasing filter may be a filter used before/after a signal sampler to restrict the bandwidth of a signal to approximately and/or completely satisfy the sampling theorem over the band of interest. Preprocessing may include calibration processing. Calibration processing may provide that all different tools may have similar responses with a tool under test with a calibration standard of a known accuracy. Preprocessed information from block 48 may be sent for further processing in either a propagation analysis 50 and/or a spatial localization analysis 52.

Figure 4:
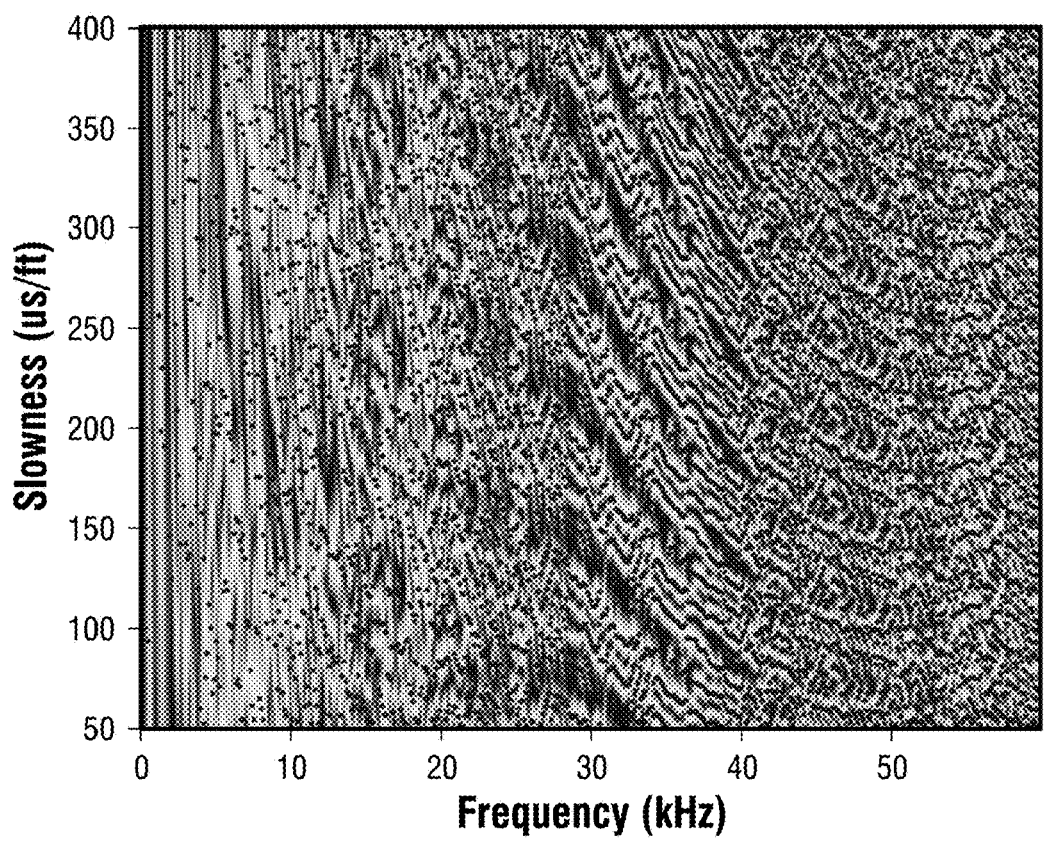
FIG. 4 illustrates a slowness vs frequency graph.

Propagation analysis 50 may take preprocessed information from block 48 and processes the data in block 54 with a dispersion analysis. A dispersion analysis may estimate, measure, and/or calculate wave velocity at different frequency. Without limitation, a dispersion analysis may be performed with a modified extended prony method, a prony method, a matrix-pencil method, and/or the like, which may estimate wave velocity at different frequencies. In embodiments, a prony method may extract valuable information from a uniformly sampled signal and build a series of damped complex exponentials or sinusoids, which may estimate frequency, amplitude, phase, and damping components of a signal. In embodiments, the matrix-pencil method may take complex matrices for some nonnegative integers, and then the matrix pencil of degree is the matrix-valued function defined on the complex numbers. The matrix pencil method may be implemented by any velocity dispersion analysis method. Based on phase, or based on time, or phase-time combination, the velocity dispersion of each acoustic mode may be calculated at different frequencies. FIG. 4 illustrates a graph illustrating preprocessed information from block 48 processed in block 54 into a slowness vs frequency graph.

Figure 5:
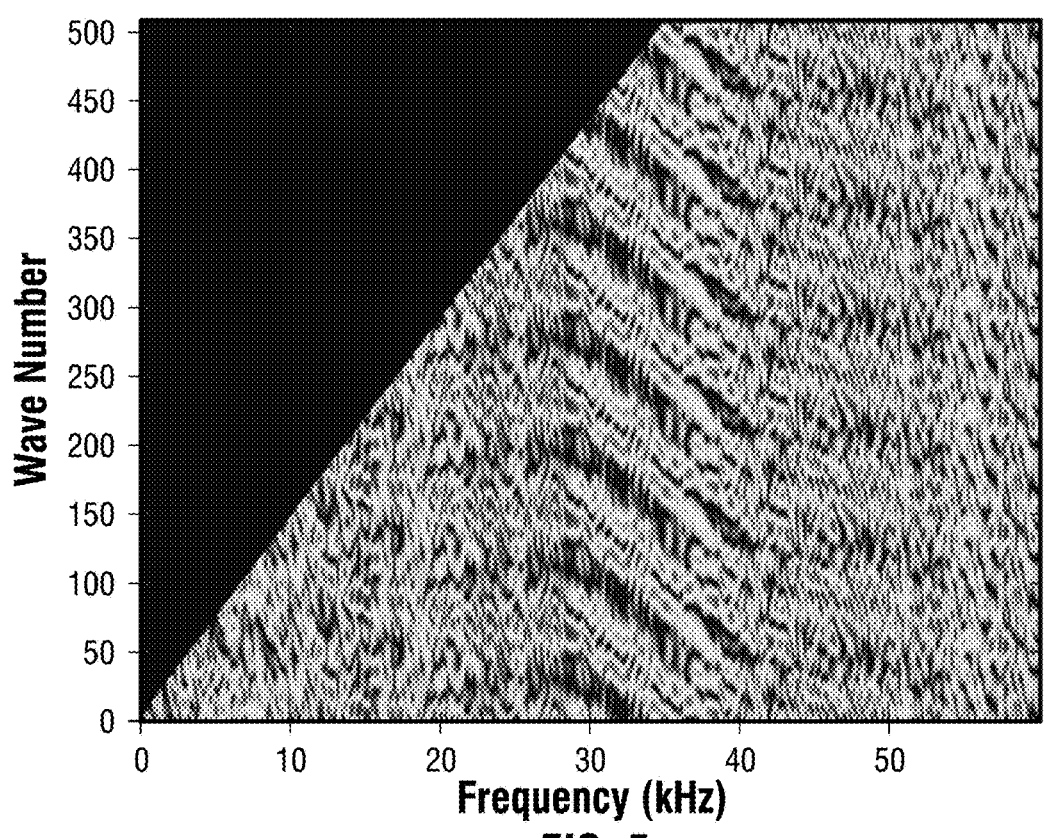
FIG. 5 illustrates a wavenumber domain vs frequency graph.
Figure 6A:
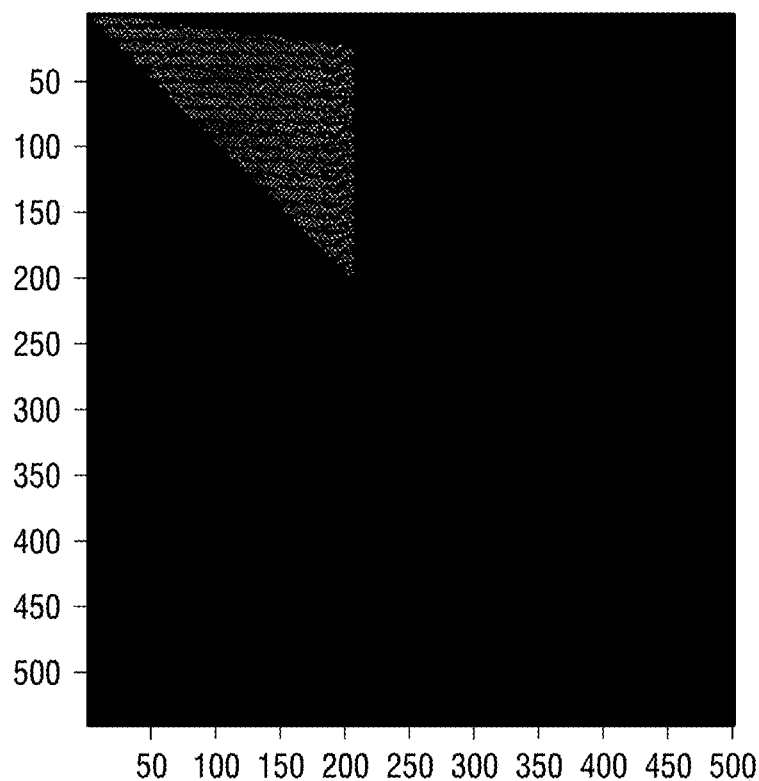
FIG. 6a illustrates a graph of a frequency band.
Figure 6B:
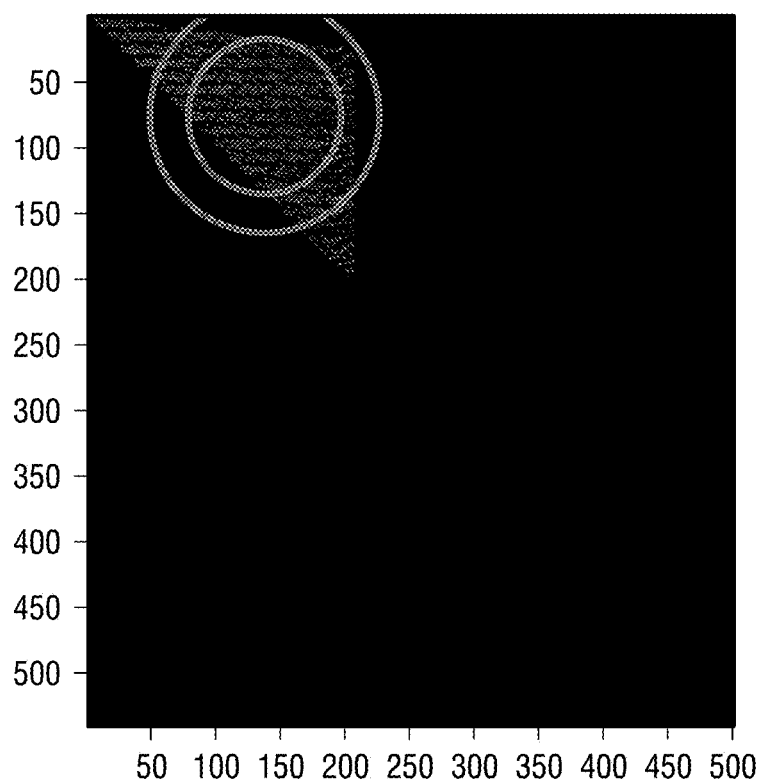
FIG. 6b illustrates a graph of an alternative frequency band.

Information from the slowness vs frequency graph in FIG. 4 may move from block 54 to block 56 for propagation transformation. In propagation transformation, the slowness-frequency information may be transferred to a wavenumber domain. FIG. 5 illustrates a wavenumber domain vs frequency graph. The information from the wavenumber domain in block 56 may be transferred to, and processed by, block 58. Block 58 may comprise space entropy equalization and normalization. This may include wavenumber domain information that may be processed in different frequency bands. FIGS. 6a and 6b illustrate graphs for different frequency bands. In block 58, the wavenumber domain information may be processed in different frequency bands. At each frequency band, all wavenumber-slowness information may be normalized based on the criteria of the equal entropy. Equal entropy may be described as the expected value of the information contained in each frequency band. The information may describe the wavenumber-slowness relationship for each acoustic mode at each frequency.

Figure 7:
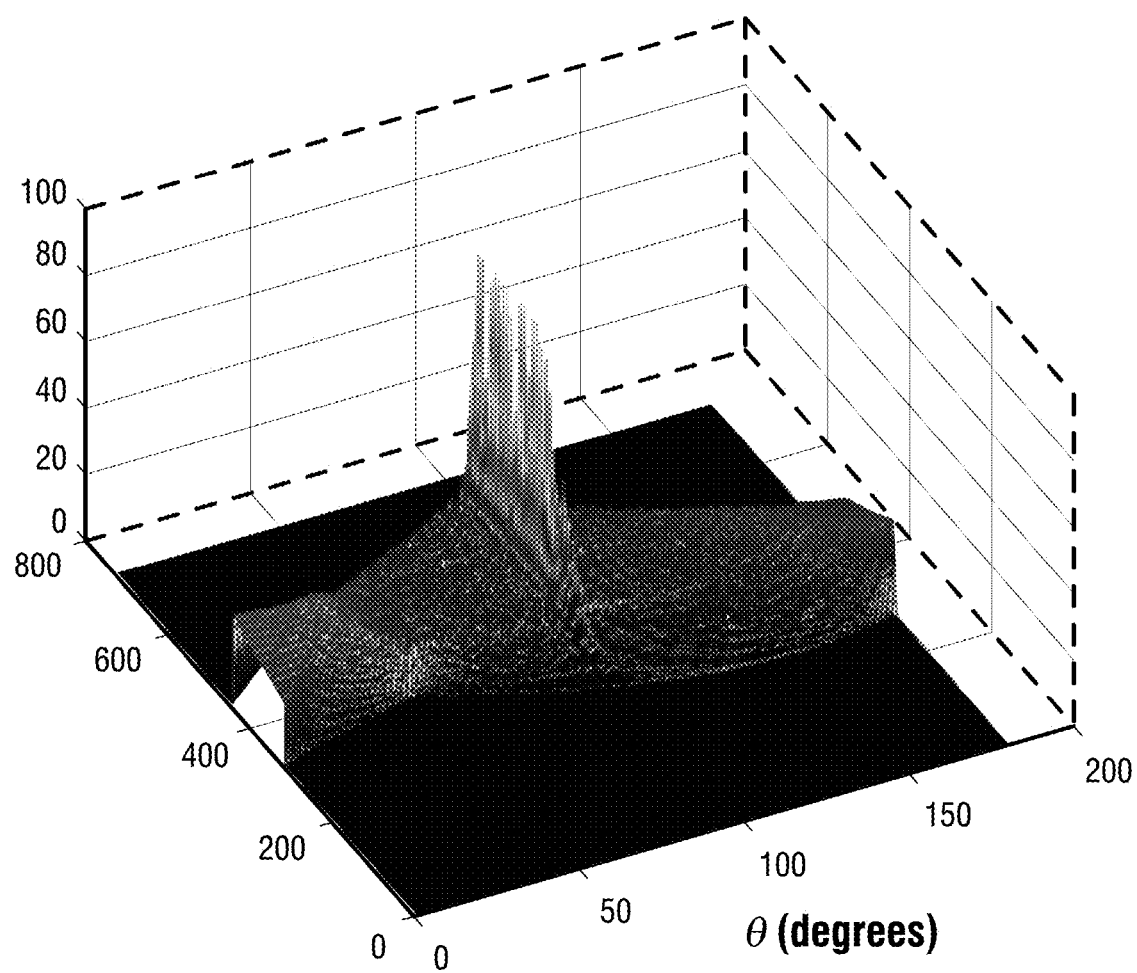
FIG. 7 illustrates a graph illustrating a main propagation mode.

As further shown in embodiment of FIG. 3, the normalized information from block 58 may then be transferred to block 60 for weighted integration. Normalized information may be integrated in the wavenumber-slowness domain. Energy may be integrated based on the different propagation degrees. After the integration, the propagation degree that may have the largest energy may be the main propagation mode in the current acoustics array measurements. FIG. 7 illustrates a graph that illustrates the spikes that may indicated the largest energy and thus the main propagation mode. After determining the largest energy and thus the main propagation mode, the information may be utilized in propagation analysis 50 for pattern recognition, identified as block 62 in FIG. 3.

Spatial localization 52, referring to FIG. 3, may calculate the Direction of Arrival at different logging depths. FIG. 8a illustrates inspection device 4 within tubing 12. An acoustic source 64 may be disposed within tubing 12. Without limitation, the acoustic source 64 may be a fluid leak, channeling, perforation inflow, sand entry, reservoir flow, and/or the like. Spatial localization may calculate the Direction of Arrival, which may pinpoint acoustic source 64. FIG. 8*a* illustrates inspection device 4 moving from a first position 65 to a second position 67. FIG. 8*b* illustrates a location of acoustic source 64 in a depth to time delay graph, block 66, referring to FIG. 3. FIG. 8*c* illustrates acoustic source 64 in a depth to radial distance graph, block 68, referring to FIG. 3. These graphs illustrate what inspection system 2 may sense and record at any given location within tubing 12. This information may allow an operator to pinpoint acoustic source 64 with information from propagation analysis 50.

Pattern recognition, in block 62, referring to FIG. 3, may be adopted when the propagation analysis 50 and spatial localization 52 may be applied with measurements from sensor array 26 from all depths. Acoustic source 64 in tubing 12 may produce a propagation pattern in FIG. 9*a*. A second order Laplace-Gaussian-Transform may be used to produce the time vs degree graph in FIG. 9*a*. Pattern recognition may pick up the leakages/acoustic pattern from processed information recorded by inspection device 4, referring to FIG. 1. FIG. 9*b* illustrates processed information in a depth verse degree measurement. Negative degrees illustrated in both FIGS. 9*a* and 9*b* may indicate acoustic source 64 may be below inspection device 4 in tubing 12. Positive degrees in both FIGS. 9*a* and 9*b* may indicated acoustic sources 64 may be above inspection device 4 in tubing 12. A pattern recognition factor graph in FIG. 9*c* illustrates depth vs pattern similarity. The graph in FIG. 9*c* may help identify where acoustic source 64 transfers from below inspection device 4 to above inspection device 4, pinpointing the location of acoustic source 64.

Figures 10, 11:
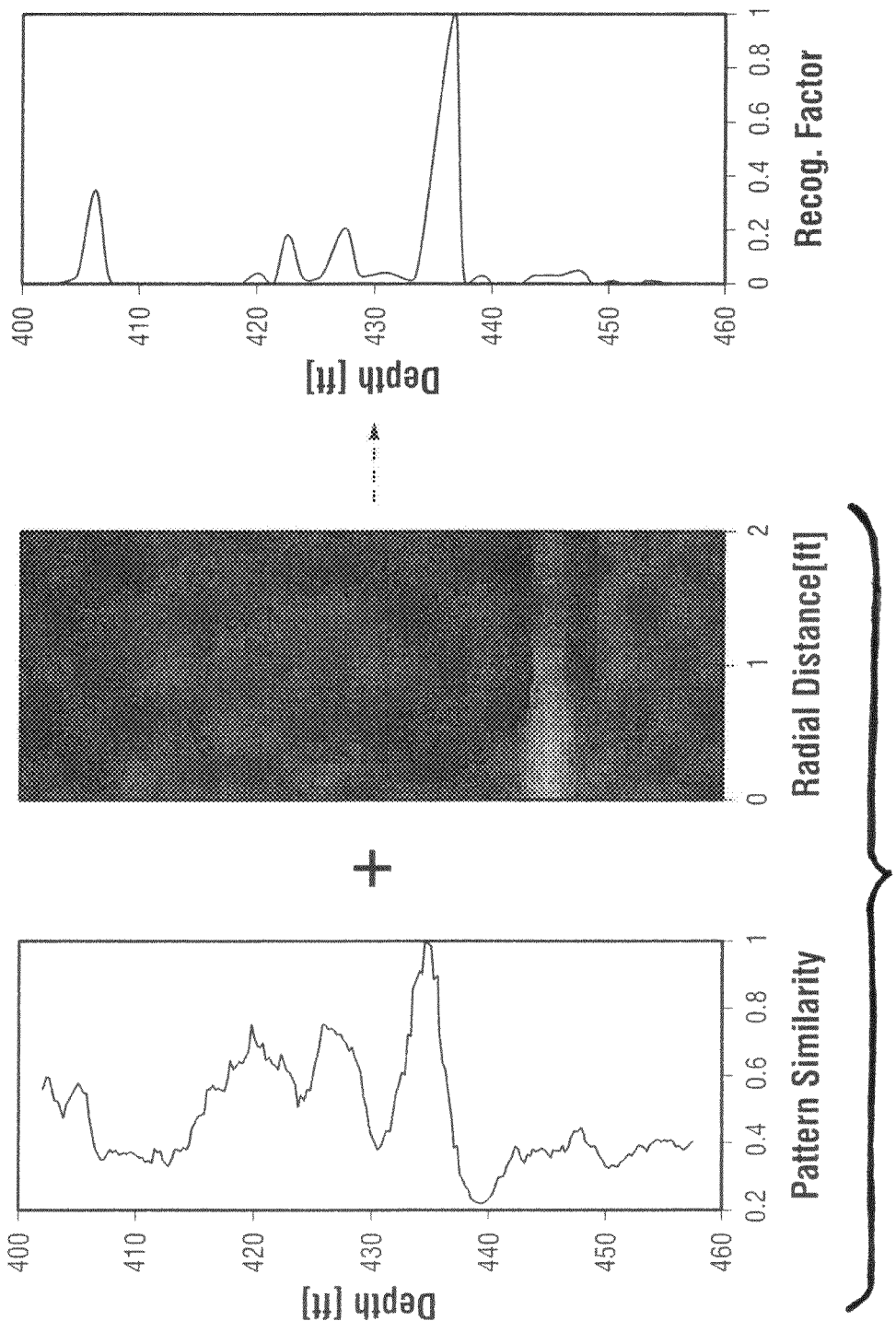
FIG. 10 illustrates combining information from FIG. 9c and FIG. 8c.
FIG. 11 illustrates the processed information of FIG. 10 produced in a graph to determine the location of an acoustic source.

Referring to FIG. 3, information from propagation analysis 50 and spatial localization 52 may be combined in block 70 for weighted enhancement of the processed data. FIG. 10 illustrates that with combining the graph of FIG. 9*c* and the graph of FIG. 8*c*, a final graph of FIG. 11 may be produced. FIG. 9*c* may help identify the acoustic source in a logging depth direction. However, some acoustic sources may not be an acoustic source of interest. For example, a leak source may be an acoustic source of interest while a seismic acoustic source that may be far from the wellbore. After inspecting tubing, there may not be any interest in acoustic source around first tubing. It may be important to know the location within the casing the acoustic source may be disposed. For different applications, an acoustic source may be in a different radial distance zone. FIG. 8*c* may provide information as to the acoustic source radial distance. In addition, for different applications, FIG. 8*c* may provide different weighted functions to emphasize the different acoustic sources for different applications. When the logging application is confirmed, FIG. 11 may be produced to provide the acoustic source indicator. FIG. 11 illustrates a recognition factor, block 72, referring to FIG. 3. The higher the recognition factor, the more likely acoustic source 64 may be present.

Although the present invention and its advantages have been described in detail, it should be understood that various changes, substitutions and alterations may be made herein without departing from the spirit and scope of the invention as defined by the appended claims.

What is claimed is:

1. A method for locating an acoustic source, comprising:
measuring noise from the acoustic source from a downhole environment, which produces a measurement for processing, using an array comprising a plurality of acoustic sensors;
performing a dispersion analysis on the measurement, wherein wave velocity at different frequencies is estimated;
performing a space entropy equalization and normalization process on the measurement, wherein wave number-slowness information is normalized;
performing a weighted integration on the measurement, wherein a main propagation mode is identified;
performing a pattern recognition on the measurement after identifying the main propagation mode;
performing spatial localization on the measurement to determine direction of arrival at different logging depths;
performing a weighted enhancement on the measurement, wherein the weighted enhancement is based on both the results of the pattern recognition and the spatial localization; and
thereby producing a recognition factor from the measurement, wherein the recognition factor indicates the presence of the acoustic source.

2. The method of claim 1, further comprising preprocessing the measurement, wherein preprocessing comprises a gain correction, a tool compensation, an environment correction, an anti-aliasing filter, or any combination thereof.

3. The method of claim 1, further comprising performing propagation transformation on the measurement.

4. The method of claim 1, wherein the weighted integration and the pattern recognition are combined to produce the recognition factor.

5. The method of claim 1, wherein the acoustic source is a fluid leak, channeling, perforation inflow, sand entry, reservoir flow, or any combination thereof.

6. The method of claim 1, wherein the step of measuring noise is performed by an inspection device comprising a sensor array.

7. The method of claim 6, wherein the sensor array comprises a monopole array, differential array, or individual azimuthal array.

8. A method for locating an acoustic source, comprising:
measuring noise from the acoustic source from a downhole environment, which produces a measurement for processing, using an array comprising a plurality of acoustic sensors;
performing a dispersion analysis on the measurement, wherein wave velocity at different frequencies is estimated;
performing a time difference scan on the measurement following the step of performing the dispersion analysis;
performing a propagation distance scan on the measurement following the step of performing the time difference scan;
performing a weighted enhancement on the measurement following the step of performing a propagation distance scan; and
producing a recognition factor from the measurement following the step of performing the weighted enhancement.

9. The method of claim 8, further comprising preprocessing the measurement, wherein preprocessing comprises a gain correction, a tool compensation, an environment correction, an anti-aliasing filter, or any combination thereof.

10. The method of claim 8, further comprising performing propagation transformation on the measurement.

11. The method of claim 8, wherein the weighted integration and the pattern recognition are combined to produce the recognition factor.

12. The method of claim 8, wherein the acoustic source is a fluid leak, channeling, perforation inflow, sand entry, reservoir flow, or any combination thereof.

13. The method of claim 8, wherein the measuring noise is performed by an inspection device comprising a sensor array.

14. The method of claim 13, wherein the sensor array comprises a monopole array, differential array, or individual azimuthal array.

15. A method for locating an acoustic source, comprising:
measuring noise from the acoustic source from a down hole environment, which may produce a measurement for processing;
performing a dispersion analysis on the measurement;
performing a space entropy equalization and normalization process on the measurement following the step of performing the dispersion analysis;
performing a weighted integration on the measurement following the step of performing the space entropy equalization and normalization process;
performing a pattern recognition on the measurement following the step of performing the weighted integration;
performing a time difference scan on the measurement following the step of performing the pattern recognition;
performing a propagation distance scan on the measurement following the step of performing the time difference scan;
performing a weighted enhancement on the measurement following the step of performing the propagation distance scan; and
producing a recognition factor from the measurement following the step of performing the weighted enhancement.

16. The method of claim 15, further comprising preprocessing the measurement, wherein preprocessing comprises a gain correction, a tool compensation, an environment correction, an anti-aliasing filter, or any combination thereof.

17. The method of claim 15, further comprising performing propagation transformation on the measurement.

18. The method of claim 15, wherein the weighted integration and the pattern recognition are combined to produce the recognition factor.

19. The method of claim 15, wherein the acoustic source is a fluid leak, channeling, perforation inflow, sand entry, reservoir flow, or any combination thereof.

20. The method of claim 15, wherein the measuring noise is performed by an inspection device comprising a sensor array.

* * * * *